United States Patent [19]
Saito et al.

[11] 4,439,393
[45] Mar. 27, 1984

[54] METHOD OF PRODUCING SYNTHETIC RESIN BOTTLE WITH HANDLE

[75] Inventors: Tadao Saito; Masao Akutsu; Hiroaki Sugiura; Shuzo Endo, all of Tokyo, Japan

[73] Assignee: Yoshino Kogyosho Co., Ltd., Tokyo, Japan

[21] Appl. No.: 273,827

[22] Filed: Jun. 15, 1981

Related U.S. Application Data

[62] Division of Ser. No. 113,352, Jan. 18, 1980, Pat. No. 4,311,246.

[30] Foreign Application Priority Data

Feb. 9, 1979 [JP] Japan ................................. 54-14521

[51] Int. Cl.³ ............................................. B29C 17/07
[52] U.S. Cl. .................... 264/532; 264/521; 264/535; 264/537; 425/525
[58] Field of Search ............... 264/537, 538, 523, 532, 264/535, 541, 521; 425/525; 215/100 A

[56] References Cited

U.S. PATENT DOCUMENTS

| | | | |
|---|---|---|---|
| 688,924 | 12/1901 | Blair et al. | 264/532 X |
| 2,831,593 | 4/1958 | Sterges | 215/1 R |
| 2,831,594 | 4/1958 | Sterges et al. | 215/1 R |
| 3,029,471 | 4/1962 | Adams et al. | 264/539 X |
| 3,050,773 | 8/1962 | Hagen | 264/534 |
| 3,278,666 | 10/1966 | Donald | 264/540 |
| 3,294,883 | 12/1966 | Polka | 264/537 X |
| 3,589,542 | 6/1971 | Dillon | 215/1 R |
| 3,900,120 | 8/1975 | Sincock | 215/1 C |
| 4,024,975 | 5/1977 | Uhlig | 215/1 C |
| 4,042,657 | 8/1977 | Ostapchenko et al. | 264/532 X |
| 4,046,275 | 9/1977 | Virog, Jr. et al. | 215/1 C |
| 4,280,805 | 7/1981 | Hafele | 264/538 X |
| 4,280,859 | 7/1981 | Thompson | 264/537 X |

FOREIGN PATENT DOCUMENTS

| | | | |
|---|---|---|---|
| 1192475 | 10/1959 | France | 264/537 |
| 1310519 | 10/1962 | France . | |
| 45-30593 | 10/1970 | Japan | 425/534 |
| 386268 | 4/1965 | Switzerland . | |
| 818618 | 8/1959 | United Kingdom | 215/100 A |
| 1003019 | 9/1965 | United Kingdom . | |
| 1053729 | 1/1967 | United Kingdom . | |

*Primary Examiner*—Jan H. Silbaugh
*Attorney, Agent, or Firm*—Parkhurst & Oliff

[57] ABSTRACT

A synthetic resin bottle produced by blow-molding a parison of a synthetic resin. In the blow-molding process of the parison, the portion of the parison supporting the handle is prevented from being expanded, thereby to sufficiently increase the supporting strength of the handle. Since the bottle product has its drum recessed in the vicinity of the handle, the grip of the handle can be facilitated.

8 Claims, 7 Drawing Figures

FIG. 4
FIG. 5
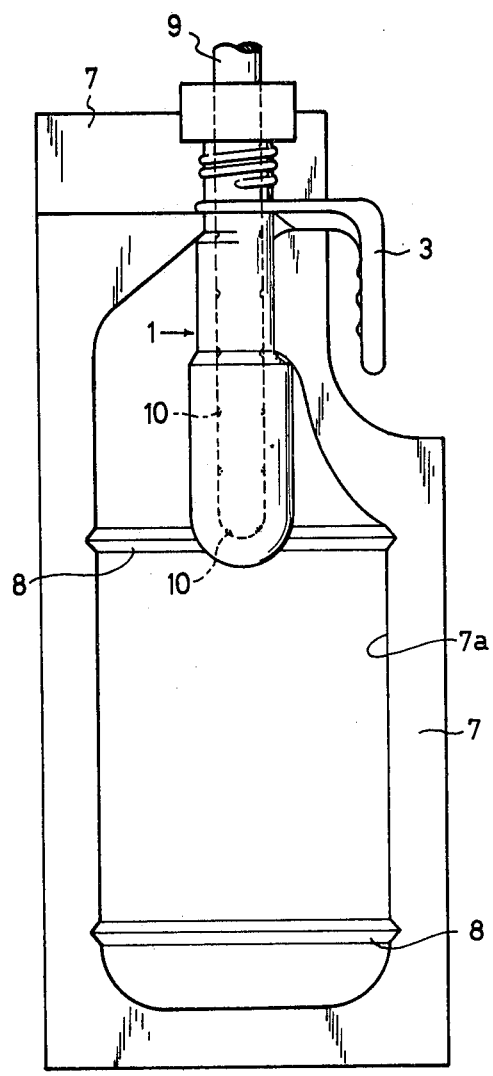
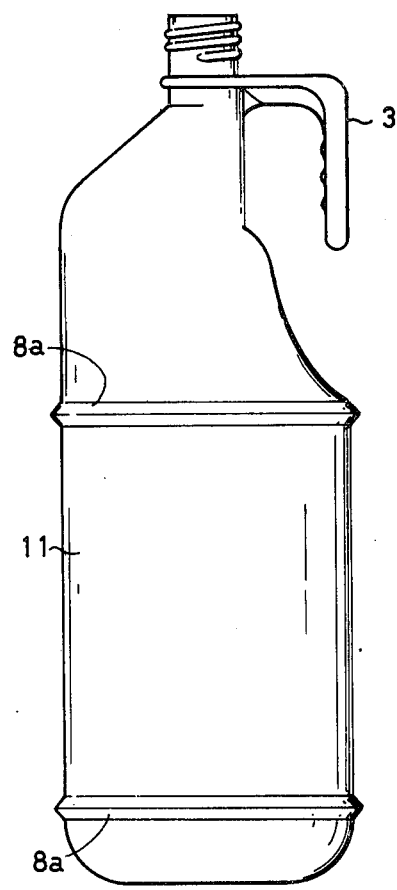

FIG. 6
FIG. 7
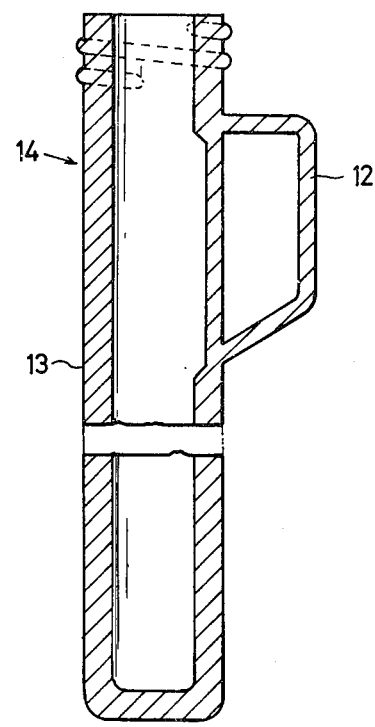
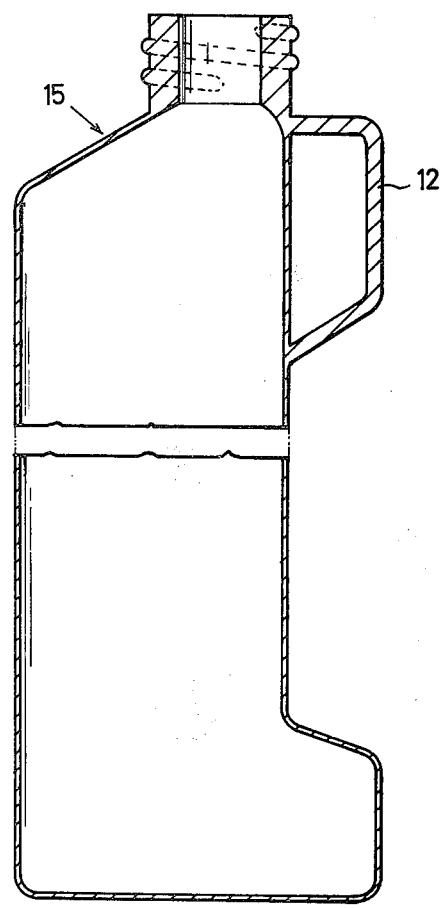

METHOD OF PRODUCING SYNTHETIC RESIN BOTTLE WITH HANDLE

This is a division of application Ser. No. 113,352 filed Jan. 18, 1980, now U.S. Pat. No. 4,311,246.

BACKGROUND OF THE INVENTION

1. Field of the Invention

The present invention relates to a synthetic resin bottle, which is produced by high-molding a tubular parison of a synthetic resin made integral with a handle, and to a method of producing the synthetic resin bottle.

2. Description of the Prior Art

In order to facilitate the grip of a bottle, a handle is attached to the bottle according to the prior art. In case, however, the bottle is made of a synthetic resin and produced by a blow-molding process, the conventional method of attaching the handle to the bottle includes the steps of blow-molding a parison without any handle and subsequently attaching a handle to the molded bottle. As a result, the number of the producing steps is increased, and it cannot be expected that the handle is attached to the bottle with a sufficient strength.

Incidentally, the reason why the handle is not made integral with the parison according to the prior art is that the supporting portion of the handle is subjected to expansion by biaxial orientation, in case it is subsequently blow-molded, so that its fixation becomes instable.

SUMMARY OF THE INVENTION

It is therefore a primary object of the present invention to provide a synthetic resin bottle, to which a handle is attached with a sufficient strength.

In the following description, the terms "bulge" and "bulging" are to be understood to refer to the expansion of the walls of the parison by biaxial orientation during blow-molding thereof.

A secondary object of the present invention is to provide a method of providing a synthetic resin bottle which is produced by blow-molding a parison, which has its drum made integral with a handle, while preventing the supporting portion of the handle and the handle from bulging, thereby to ensure the sufficient strength of the handle.

A tertiary object of the present invention is to provide a synthetic resin bottle which has its grip facilitated by blow-molding the drum of a parison in a manner to prevent the parison from bulging in the vicinity of the handle while holding a preset spacing between the handle and the outer wall of the bottle.

According to a primary feature of the present invention, there is provided a synthetic resin bottle with a handle, which is prepared by biaxially orienting a parison of a synthetic resin by a blow molding process, said synthetic resin bottle comprising: a handle protruding sideway of a lower portion of the neck of said bottle; an upper body portion extending downward of said neck and bulging only in the opposite direction to said handle; and a lower body portion extending downward of said upper body portion and having its handle side bulging up to the lower extension of said handle and its opposite side bulging up to the lower extension of said upper body portion, said lower body drum portion being formed with a bottom wall at its lower end.

According to a secondary feature of the present invention, there is provided a method of producing a synthetic resin bottle with a handle, said method comprising: a first step of injection-molding a synthetic resin into a parison which has a handle protruding sideway of a neck thereof; a second step of heating said parison to such a temperature as can blow-mold the same and subsequently setting only the drum of said parison in the cavity of a blow mold; and a third step of inserting a blow-pipe into said parison thereby to blow air under high pressure into the same.

BRIEF DESCRIPTION OF THE DRAWINGS

FIG. 4 is a section showing the condition under which the parison is set in a blow mold;

FIG. 5 is a front elevation showing a bottle which is produced by the method according to the present invention;

FIG. 6 is a longitudinal section showing a parison to be used in a second embodiment of the present invention; and FIG. 7 is also a longitudinal section showing a bottle which is produced by the second embodiment of the present invention.

PREFERRED EMBODIMENTS OF THE PRESENT INVENTION

Figure 1:
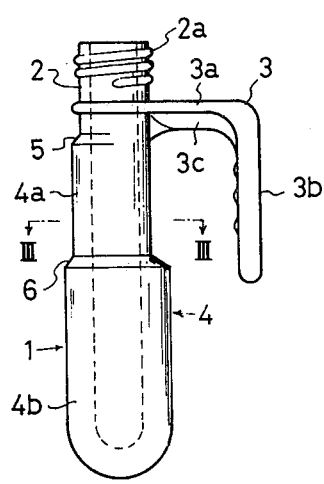
FIG. 1 is a front elevation showing a parison of a synthetic resin to be used in a first embodiment of the present invention.
Figure 2:
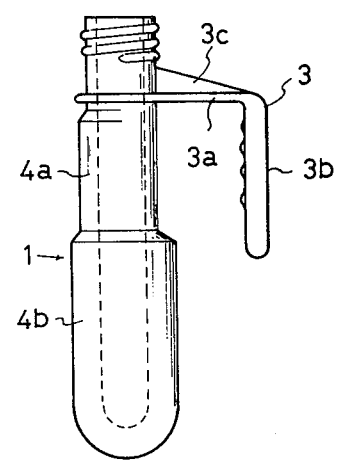
FIG. 2 is also a front elevation but shows a modification of the synthetic resin parison.
Figure 3:
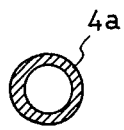
FIG. 3 is a section taken along line III—III of FIG. 1.

A first embodiment of the present invention will be described with reference to FIGS. 1 to 5. A parison 1 to be used in the first embodiment is prepared by injection-molding a synthetic resin such as a saturated polyester resin into a tubular shape. The parison 1 thus prepared has its neck 2 formed on its circumference with a screw thread 2a. A handle 3 is made integral with the neck 2 such that it protrudes sideway of a lower portion of the latter. The handle 3 is formed generally into a shape of an inverted letter "L" such that its transverse arm portion 3a is reinforced at its lower side with a rib 3c and that its longitudinal grip portion 3b is formed with a slip stopper at the inner side thereof. In an alternative, embodiment the reinforcing rib of the handle 3 may be formed on the upper side of the arm portion 3a, as shown in FIG. 2.

There is formed below the neck a drum 4 which extends from the lower portion of the same and which is closed at its lower end with a not-numbered bottom wall. An upper drum portion 4a merges into the lower end of the neck 2 through a taper shoulder 5 which is shaped to diverge downward. The upper drum portion 4a thus shaped has its lower end merging into a lower portion 4b through a taper transition portion 6 which is shaped to further diverge downward. On the other hand, the upper drum portion 4a is made the thinner as it approaches laterally handle 3, as better shown in FIG. 3. As a result, the taper shoulder 5 is not found in the portion in the vicinity of the handle 3. On the contrary, the lower drum portion 4b extends linearly all over the circumference from the lower end of the taper transition portion 6 with a larger thickness than the upper drum portion 4a.

The parison 1 thus prepared is set in a blow mold 7, which has been heated to a preset temperature, on that it may be blow-molded. The blow mold 7 is formed with a cavity 7a which is shaped to have a contour of the bottle product. The parison 1 has its handle 3 protruding outward because it is used as that of the bottle. On the other hand, the portion of the parison facing the handle 3 is held in contact with the inner wall of the mold 7 with a view to being prevented from bulging so that a preset spacing may be maintained between the handle 3 and the outer wall of the bottle product. The neck 2 of the parison 1 is also prevented from bulging so that it is also held in contact with the inner wall of the mold 7. Thus, a plurality of mold members are assembled so that the drum of the parison 1 to be oriented is set in the cavity of the mold assembly. On the other hand, the mold 7 is formed with two annular grooves 8 which are used to provide two reinforcing annular ribs 8a in the body of the bottle product.

After that, the parison 1 thus prepared is heated to such a temperature level as can effect the blow-molding process. Then, a blow-pipe 9 is inserted into the parison 1, and air under high pressure is blown into the parison 1 through a plurality of nozzles 10 of the blow-pipe, while pushing down the bottom portion of the parison 1 with the leading end of the blow-pipe 9, so that the parison drum is oriented to complete a bottle product 11. Incidentally, the parison drum is oriented until its other circumference comes substantially to the longitudinal extension of the outer end of the handle. Moreover, the portion of the drum in the vicinity of the handle does not bulge at all toward the handle so that the aforementioned preset spacing is held between the handle and the bottle body. Thus, the bottle product after the blow-molding process is shaped to correspond to the cavity 7a of the mold 7. Finally, the mold 7 is disassembled so that the bottle product is taken out.

The synthetic resin bottle thus completed by the aforementioned method can enjoy a sufficient handle supporting strength partly because the handle is made integral while the parison is being molded and partly because both the attaching portion of the handle to the parison neck and the drum portion in the vicinity of the handle are prevented from bulging during the blow-molding process. Moreover, the grip of the handle can be facilitated because the bottle body portion in the vicinity at the handle is recessed. Still moreover, the bottles can be conveniently handled for storage because the outer end of the handle is substantially in line with the outer circumference of the bottle body.

According to the producing method thus far described, the production itself can be facilitated in comparison with the conventional method, by which the handle is attached to the drum of the bottle after the blow-molding process, because the parison has already been made integral with the handle when it is to be molded. Moreover, it is possible to produce a bottle which has a sufficient handle supporting strength partly because the handle is integrally attached during the molding process of the parison and partly because the handle supporting portion will not bulge during the blow-molding process.

A second embodiment of the present invention will now be described with reference to FIGS. 6 and 7. According to the second embodiment, a handle 12 is attached at its two upper and lower portions to a drum 13 of the bottle. This construction is made by preparing a parison 14 which has its drum 13 formed with the handle 12 when it is to be subjected to the injection-molding process. The parison drum 13 has its portion in the vicinity of the handle 12 made thinner than the remaining portion thereof. When the parison 14 thus prepared is to be set in the blow-mold, the handle 12 is left to protrude from the mold, and the drum portion in the vicinity of the handle 12 is held in contact with the inner wall of the mold.

After that, the blow-molding process is performed in a similar manner to that of the first embodiment so that a bottle product 15, as shown in FIG. 7, is completed. The bottle thus produced and the producing method thereof can enjoy the same effects as those of the first embodiment. Moreover, since the blow-molding process is accomplished with the handle protruding from the mold, only the handle can be prevented from crystallizing thereby to enhance the decorative effects. Incidentally, this is because the saturated polyester resin will crystallize to turn white when it is heated at a higher temperature than its glass transition level for a preset time period. Thus, the bottle wall excepting the handle and the neck can be formed with decorative white patterns by such heat treatment.

What is claimed is:

1. A method of forming a nonsymmetrical container having walls of equal thickness, comprising the steps of: forming a parison having a top portion, a central portion, a lower portion, and a handle extending laterally of said top portion and said central portion, said parison defining an axially off-center annular cavity in its central section whereby said central section is formed with a first thin wall portion adjacent said handle and a circumferentially opposing second wall portion thicker than said first wall portion; heating at least said central and lower portion of said parison; placing said parison in at least one mold defining the shape of said nonsymmetrical container such that said thin wall portion lies in direct contact with said mold; and inserting a blow pipe into said parison and blowing air under high pressure into said parison, said thin wall portion being prevented from undesirable expansion by said contact with said mold while said central and lower portions other than said thin wall portion expand and are biaxially oriented upon said blowing.

2. A method according to claim 1 wherein only the central and lower portion of said parison is placed in a blow mold.

3. A method according to claim 1 wherein said blow pipe defines a plurality of openings about its surface.

4. A method according to claim 1 wherein said blow pipe biaxially stretches said parison.

5. A method according to claim 1 wherein said parison is composed of a synthetic resin and is injection molded.

6. A method according to claim 1 wherein said handle has a portion which encircles said top portion acting as a strengthening rib.

7. A method according to claim 1 wherein the cavity wall of said blow mold defines at least one annular groove such that a parison molded in such cavity will bear in its final form at least one strengthening rib.

8. A method of forming a nonsymmetrical container having walls of equal thickness, comprising the steps of: forming a parison having a neck portion and a base portion and a handle extending laterally of said neck portion and said base portion, said parison defining a nonsymmetrical cavity which lies longitudinally within said neck portion and said base portion, whereby a wall portion of said base portion adjacent said handle is thinner than at least the circumferentially opposite wall of said parison; heating at least said base portion of said parison; placing said parison in at least one mold defining the shape of said nonsymmetrical container such that said thin wall portion lies in direct contact with said mold; and inserting a blow pipe into said parison and blowing air under high pressure into said parison to expand and biaxially orient said base portion other than said thin wall portion which is prevented from undesirable expansion by said contact with said mold.

* * * * *